Patented Jan. 2, 1923.

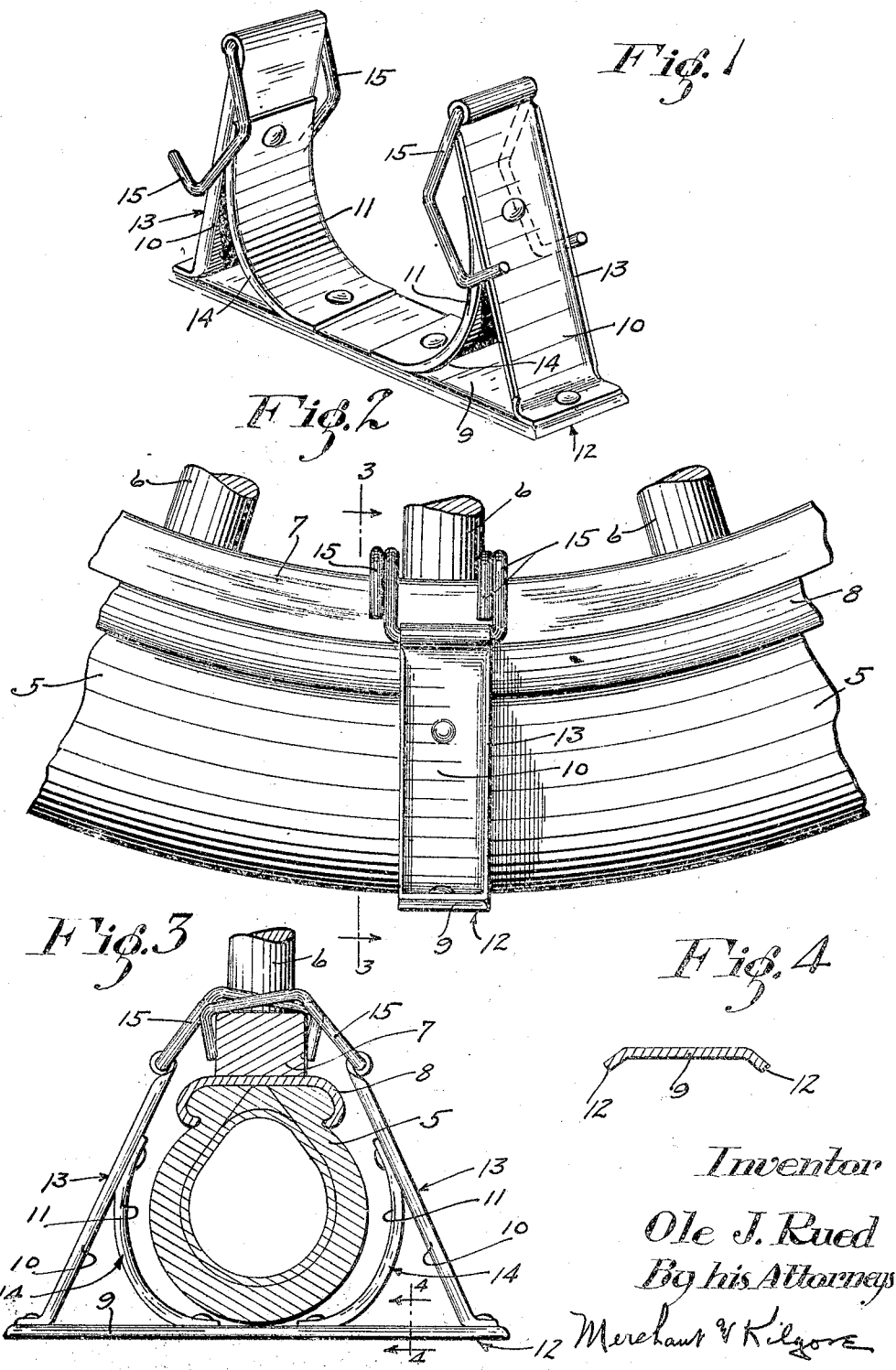

1,441,175

UNITED STATES PATENT OFFICE.

OLE J. RUED, OF WOODWORTH, NORTH DAKOTA.

MUD SHOE FOR VEHICLE WHEELS.

Application filed November 21, 1921. Serial No. 516,649.

*To all whom it may concern:*

Be it known that I, OLE J. RUED, a citizen of the United States, residing at Woodworth, in the county of Stutsman and State of North Dakota, have invented certain new and useful Improvements in Mud Shoes for Vehicle Wheels; and I do hereby declare the following to be a full, clear, and exact description of the invention, such as will enable others skilled in the art to which it appertains to make and use the same.

My invention has for its object to provide a highly efficient and simple detachable mud shoe for vehicle wheels which may be easily applied to a wheel or removed therefrom.

To the above end, the invention consists of the novel devices and combination of devices hereinafter desired and defined in the claims.

In the accompanying drawings, which illustrate the invention, like characters indicate like parts throughout the several views.

Referring to the drawings:

Fig. 1 is a perspective view of the improved mud shoe;

Fig. 2 is a fragmentary side elevation of a pneumatic tire-equipped wheel to which the improved mud shoe is applied;

Fig. 3 is a view partly in edge elevation and partly in transverse section taken on the line 3—3 of Fig. 2; and Fig. 4 is a detail view in section taken on the line 4—4 of Fig. 3;

For the purpose of showing the invention applied in working position, there is illustrated in the drawings, an automobile wheel of the artillery type, equipped with a pneumatic tire 5, and, of the parts of said wheel, it is important to note the spokes 6 and felly 7 to which is secured a rim 8 in which said tire is mounted.

The improved mud shoe comprises a tread plate 9, legs 10 and braces 11, all of which, as shown, are formed from flat sheet metal, and the edges of the tread plate 9 are turned outward to afford traction flanges 12, and the edges of said legs 10 and braces 11 are bent laterally to afford reinforcing flanges 14.

The legs 10 are arranged to extend inward in respect to the wheel and are rigidly secured to the outer ends of the tread plate 9 in converging relation, and the braces 11 are in the form of segments which rigidly connect the legs 10 to the tread plate 9 inward of said legs. As shown in Fig. 3, the legs 10 and braces 11 are arranged to loosely receive the tire 5, for a purpose that will presently appear.

To detachably secure the mud shoe to the wheel, there is hinged to the inner end of each leg 10, a bifurcated hook 15. These hooks 15 are arranged to be turned transversely across the felly 7 for engagement with the opposite sides thereof, from the leg 10 to which the respective hook is hinged. The two hooks 15 are interlapped and embrace one of the spokes 6, as best shown in Fig. 2, to hold the mud shoe against circumferential movement on the tire 5.

The bodies of the hooks 15 are bent so that they only engage the longitudinal edge of the felly 7 at the side thereof engaged by said hooks so that said hooks normally extend at an angle to the inner face of the felly so as to permit transverse angular movements of the mud shoe, in respect to the tire 5, in case its tread plate 9 should engage at one end, a stone or other obstruction, or in case one end of said tread plate 9 should sink deeper into the road than the other end thereof. The purpose of thus mounting the mud shoe is to permit the same to freely move transversely of the tire to prevent bending or other damage thereto.

In actual usage a wheel will be equipped with a multiplicity of the mud shoes. The improved mud shoe can be very easily and quickly applied to a wheel even if the same is in a deep rut, and it is especially adapted for use on muddy roads or in traveling over fields, to prevent the wheels from sinking deeply therein.

As the tread plate 9 and its traction flanges are very shallow, they do not interfere in any way with a vehicle while traveling on a hard road. The flanges on the tread plate 9 prevent side skidding and, at the same time, greatly increase the traction.

What I claim is:

1. A mud shoe for vehicle wheels comprising a tread plate having a pair of inwardly extended legs arranged to receive the tire of a vehicle wheel therebetween for engagement with the tread plate, and anchoring means for the mud shoe applied to the legs thereof and arranged to extend transversely of said wheel for direct detachable engagement therewith, said mud shoe being free to move angularly transversely of said tire.

2. The structure defined in claim 1 in which the legs are in converging relation, 3. A mud shoe for vehicle wheels comprising a tread plate having a pair of inwardly extended legs arranged to receive the tire of the wheel therebetween for engagement with the tread plate, and hooks hinged to the legs and arranged to extend across the felly of the wheel for direct biting engagement with the felly on opposite sides thereof.

4. A mud shoe for vehicle wheels comprising a tread plate having a pair of inwardly extended legs arranged to receive the tire of the wheel therebetween for engagement with the tread plate, and bifurcated hooks hinged to the legs and arranged to extend across the felly of the wheel in interlapped relation for direct biting engagement with the felly on opposite sides thereof.

5. A mud shoe for vehicle wheels comprising a tread plate having a pair of inwardly extended legs arranged to receive the tire of the wheel therebetween for engagement with the tread plate, and bifurcated hooks hinged to the legs and arranged to extend across the felly of the wheel in interlapped relation for direct biting engagement with the felly on opposite sides thereof, with one of the spokes of the wheel therebetween.

6. A mud shoe for vehicle wheels comprising a tread plate having a pair of inwardly extended legs arranged to receive the tire of the wheel therebetween for engagement with the tread plate, and hooks hinged to the legs and arranged to extend across the felly of the wheel for direct biting engagement with the felly on opposite sides thereof, said hooks normally extending angularly across the felly of the wheel in crossed relation to permit said angular movement of the mud shoe.

In testimony whereof I affix my signature.

OLE J. RUED.